United States Patent
Stanga

(10) Patent No.: US 12,278,876 B1
(45) Date of Patent: Apr. 15, 2025

(54) AUGMENTING WEB SERVERS WITH ENDPOINTS

(71) Applicant: UAB 360 IT, Vilnius (LT)

(72) Inventor: Vilius Stanga, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 18/631,343

(22) Filed: Apr. 10, 2024

(51) Int. Cl.
*H04L 67/568* (2022.01)
*H04L 67/02* (2022.01)
*H04L 67/63* (2022.01)

(52) U.S. Cl.
CPC ............ *H04L 67/568* (2022.05); *H04L 67/02* (2013.01); *H04L 67/63* (2022.05)

(58) Field of Classification Search
None
See application file for complete search history.

(56) References Cited

U.S. PATENT DOCUMENTS

| | | | | |
|---|---|---|---|---|
| 6,049,821 | A * | 4/2000 | Theriault | H04L 63/0236 707/E17.121 |
| 7,865,569 | B1 * | 1/2011 | Tock | H04L 63/0823 709/217 |
| 8,010,670 | B2 * | 8/2011 | Singh | H04L 67/5682 709/225 |
| 8,793,804 | B2 * | 7/2014 | Bekker | H04L 67/02 726/26 |
| 8,868,740 | B2 * | 10/2014 | Pitchaikani | H04L 67/53 709/224 |
| 9,344,512 | B2 * | 5/2016 | Hershberg | H04L 67/563 |
| 9,882,957 | B1 * | 1/2018 | Mostert | H04J 67/02 |
| 2002/0099852 | A1 * | 7/2002 | Fischer | G06F 16/9577 709/218 |
| 2003/0182424 | A1 * | 9/2003 | Odendahl | G06F 16/957 707/E17.119 |
| 2005/0144277 | A1 * | 6/2005 | Flurry | H04L 67/56 709/225 |
| 2006/0020684 | A1 * | 1/2006 | Mukherjee | H04L 67/561 709/219 |
| 2008/0320151 | A1 * | 12/2008 | McCanne | H04L 67/01 709/228 |
| 2009/0024701 | A1 * | 1/2009 | Flurry | H04L 67/563 709/203 |
| 2011/0119331 | A1 * | 5/2011 | Zhang | H04L 61/2528 709/229 |
| 2012/0054828 | A1 * | 3/2012 | Jiang | G06F 11/3696 703/23 |
| 2014/0281918 | A1 * | 9/2014 | Wei | H04L 67/56 715/234 |
| 2014/0339840 | A1 * | 11/2014 | Stern | A47J 43/283 294/106 |
| 2016/0077824 | A1 * | 3/2016 | Vishnepolsky | G06F 21/53 717/172 |

(Continued)

*Primary Examiner* — Lashonda Jacobs-Burton
(74) *Attorney, Agent, or Firm* — Young Basile Hanlon & MacFarlane, P.C.

(57) ABSTRACT

An intermediary between a client and a target receives response data from the target based on a first request from the client to the target. The intermediary includes in the response data an endpoint interpretable by the client as being available at the target. The intermediary receives a second request from the client directed to the target at the endpoint. The intermediary processes the second request directed to the target without forwarding the second request to the target.

20 Claims, 11 Drawing Sheets

(56) References Cited

U.S. PATENT DOCUMENTS

| | | | |
|---|---|---|---|
| 2016/0241664 A1* | 8/2016 | Xia | H04L 67/01 |
| 2018/0375950 A1* | 12/2018 | Walker | H04L 67/563 |
| 2020/0304476 A1* | 9/2020 | Moore | H04L 63/0281 |
| 2020/0374197 A1* | 11/2020 | Vysotsky | H04L 45/22 |
| 2022/0116362 A1* | 4/2022 | Zihnioglu | G06F 9/45558 |
| 2022/0247829 A1* | 8/2022 | Vilcinskas | H04L 67/56 |

\* cited by examiner

```
<!DOCTYPE HTML>
<HTML LANG="EN">
<HEAD>
  <META CHARSET="UTF-8">
  <TITLE>CORS PROBLEM ILLUSTRATION</TITLE>
  <!-- ORIGINAL STYLESHEET FROM EXAMPLE.COM DOMAIN -->
  <LINK REL="STYLESHEET" HREF="HTTP://EXAMPLE.COM/STYLES/ORIGINAL.CSS">
  <!-- INJECTED EXTERNAL STYLESHEET ACTING AS AN AD BLOCKER -->
  <LINK REL="STYLESHEET" HREF="HTTP://ANOTHERDOMAIN.COM/STYLES/ADBLOCKER.CSS">
</HEAD>
<BODY>
  <H1>THIS IS A PAGE THAT ORIGINATES FROM EXAMPLE.COM</H1>
  <P>THIS PAGE ATTEMPTS TO USE AN AD-BLOCKING STYLESHEET FROM ANOTHER DOMAIN AND AN ORIGINAL STYLESHEET FROM ITS OWN DOMAIN.</P>
</BODY>
</HTML>
```

FIG. 4

```
// FETCH INFORMATION ABOUT A LINK FROM THE PROXY
ASYNC FUNCTION FETCH_LINK_DATA(ELEMENT) {
    CONST LINK = ELEMENT.GETATTRIBUTE('HREF');
    // URL IS RELATIVE SO FETCH WILL HAPPEN ON THE SAME ORIGIN
    CONST REQUESTURL = '/FORME990011/CHECK-LINK?LINK=${ENCODEURICOMPONENT(LINK)}';
    CONST RESPONSE = AWAIT FETCH(REQUESTURL);
    // USE THE RESPONSE TO BLOCK THE LINKS OR DISPLAY WARNINGS
    IF (RESPONSE.TEXT() == 'BLOCK') {
        ELEMENT.SETATTRIBUTE('HREF', '/FORME990012/BLOCK-PAGE');
    }
};

// PROCESS ALL <A> ELEMENTS ON THE PAGE
FUNCTION PROCESS_LINKS() {
    CONST LINKS = DOCUMENT.QUERYSELECTORALL('A');
    LINKS.FOREACH(ELEMENT => {
        FETCH_LINK_DATA(ELEMENT);
    });
}

//ALL LINKS ON THE PAGE ARE SCANNED AT A FIXED TIME INTERVAL
SETINTERVAL(PROCESSLINKS, 5000);
```

AUGMENTING WEB SERVERS WITH ENDPOINTS

BACKGROUND

In the digital age, typical interactions between a client device and the web encompass both the retrieval of static web pages and the dynamic updating of content on an already loaded page. Such interactions may start with a client, such as a web browser, issuing a request to a target (e.g., a web server), which may either serve a specific webpage or implement services that provide dynamic content updates. Upon receiving the request, the target processes the request. For static content, the target responds by sending the requested webpage back to the client. For dynamic updates, the target processes the request and may send back data used to update the webpage in real-time without a full page reload.

SUMMARY

Disclosed herein are one or more examples of implementations of augmenting web servers with endpoints.

An aspect of the disclosure is a method that includes receiving, by an intermediary between a client and a target, response data from the target based on a first request from the client to the target; including in the response data, by the intermediary, an endpoint interpretable by the client as being available at the target; receiving, by the intermediary, a second request from the client directed to the target at the endpoint; and processing, by the intermediary and without forwarding to the target, the second request directed to the target.

Another aspect of the disclosure is a device that includes one or more memories and one or more processors. The one or more processors are configured to execute instructions stored in the one or more memories to receive response data from a target device based on a first request from a client device to the target device, where the device is an intermediary between the client device and the target device; include in the response data an endpoint interpretable by the client device as being available at the target device; receive a second request from the client device directed to the target device at the endpoint; and process, without forwarding to the target device, the second request directed to the target device.

Another aspect of the disclosure is one or more non-transitory computer-readable storage media, comprising executable instructions that, when executed by one or more processors, perform operations that include receiving, by an intermediary between a client and a target, response data from the target based on a first request from the client to the target; including in the response data, by the intermediary, an endpoint interpretable by the client as being available at the target; receiving, by the intermediary, a second request from the client directed to the target at the endpoint; and processing, by the intermediary and without forwarding to the target, the second request directed to the target.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4. is an example of a web page that illustrates loading a resource from a source that is different from the origin of the web page.

FIG. 9 illustrates an example of injected content that augments a target with endpoints.

DETAILED DESCRIPTION

Figure 1:
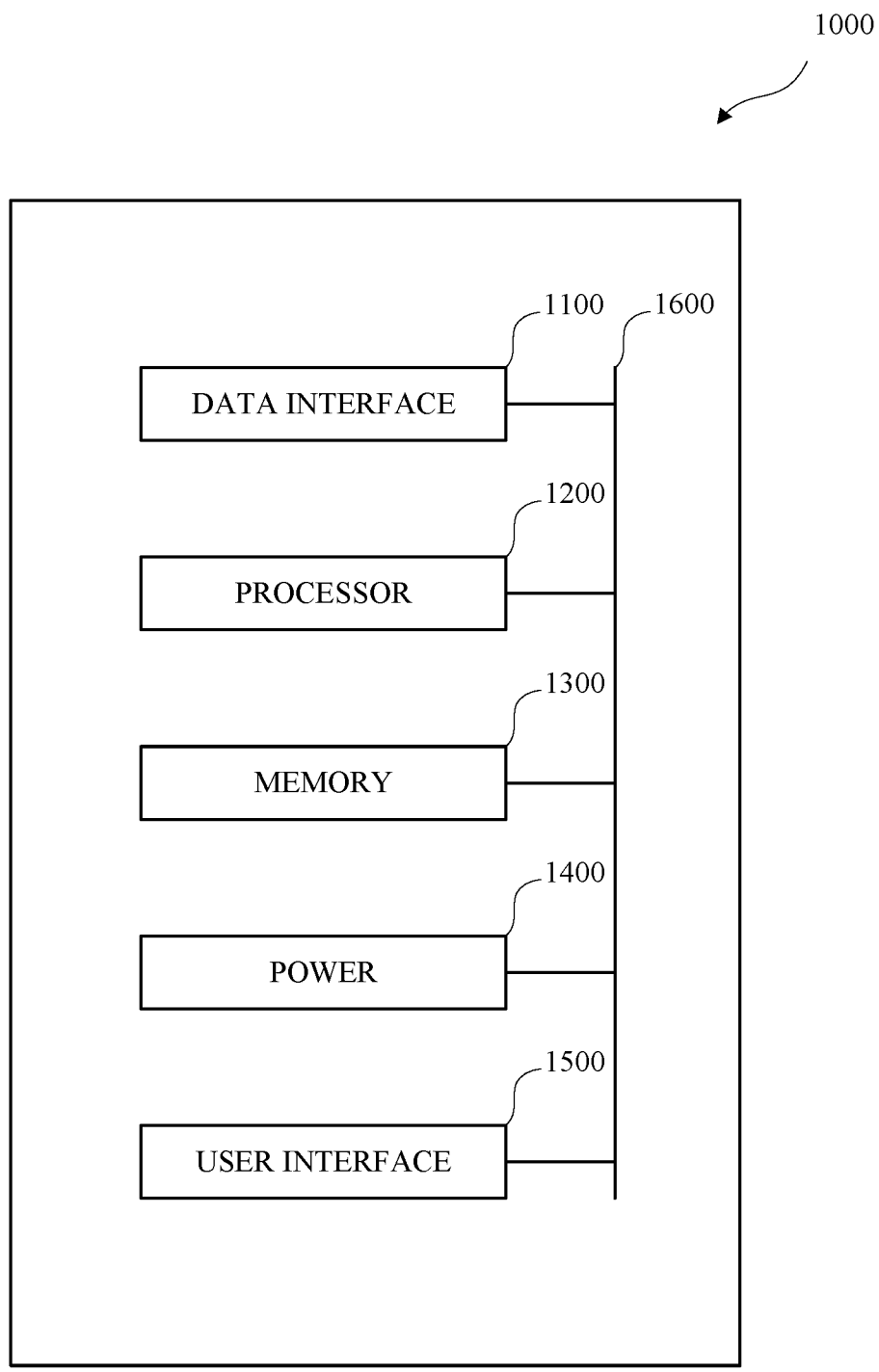
FIG. 1 is a block diagram of an example of a computing device.

Content received from a target (e.g., a web server) may, for example, lead to the rendering of advertisements on the client device. Additionally, there is a legitimate concern that such content could include undesirable elements, such as malware or intrusive tracking mechanisms, which could compromise user privacy and security. Within the context of web interactions, there is a need to augment web pages with additional functionality such as advertisements blocking, threat protection, and content customization.

Ad blockers prevent the display of advertisements on web pages. This not only declutters the browsing experience, allowing users to focus on the content they are interested in, but also can significantly reduce page load times and data usage. By blocking ads, users are also less exposed to potentially malicious ads that could compromise the security of their devices. By integrating threat protection mechanisms directly into web pages, users can be shielded from various online threats such as malware, phishing attacks, and other malicious activities that could lead to data theft, privacy breaches, or system compromise. Threat protecting mechanisms may scan content, links, and resources in real-time. Via content customization, a personalized browsing experience can be enabled by tailoring the content and layout of web pages to match the user preferences, interests, and browsing habits. Content customization may include filtering out irrelevant content, highlighting information of interest, or adjusting the visual presentation of a site.

Such functionalities are typically implemented by injecting code (e.g., functionality) into web pages where the code implements removal or neutralization of the undesirable elements. The injected code may request resources from a location (e.g., an origin) that is different from the original source of a page. However, web browsers, designed with strict security mechanisms, often restrict resources based on their origin to prevent malicious activities, such as cross-site scripting. This creates a challenge when trying to inject external resources such as styles, scripts, or other elements necessary for enhanced web functionalities. For instance, a threat protection service might need to inject a script into a webpage to block malicious content or undesirable advertisements. However, doing so from a different origin can trigger browser security warnings or block the content altogether due to origin restrictions. FIG. 4 illustrates an example of loading resources from a different origin.

Traditionally, developers have employed various strategies to circumvent these restrictions, including direct cross-origin requests or injecting content directly into the content (e.g., the Hypertext Markup Language (HTML) content) of a webpage. These strategies, while effective in some scenarios and to a certain extent, come with their own set of challenges, including performance bottlenecks, security vulnerabilities, and a reliance on external network resources. Directly injecting scripts or styles into a webpage allows for immediate modifications but can significantly slow down page loading times and expose the page to potential security risks.

Implementations of augmenting web servers with endpoints (e.g., additional endpoints) solve problems such as these by leveraging proxies (e.g., transparent proxies) to serve required resources as if they were originating from the website the user is visiting thereby avoiding CORS issues and browser warnings. Proxies act as intermediaries between clients and targets (e.g., servers), facilitating or modifying requests and responses in transit.

Transparent proxies, which are unique in that they can operate without the explicit knowledge of either the client or the target, can be used to maintain a facade of direct communication between the client and a target. The proxy injects content (e.g., links to resources) into a web page received from an origin in such a way that the client attempts to retrieve the injected resources from the origin when in fact the resources will be served (e.g., returned to the client) by the proxy.

When loading content injected by a proxy into a webpage originating from a target, as described herein, the client operates under the assumption that this content is being provided by the originating target. A proxy can modify forward HyperText Transport Protocol (HTTP) requests and responses while in transit, thus introducing additional content into web pages. Augmenting web servers with endpoints obviates (e.g., makes unnecessary) security measures that typically block content from disparate origins. Advantage of the techniques described herein include that they bolster security and performance by obviating the need for cross-origin requests and enhance the user experience by allowing for dynamic web page enhancements without reliance on external network resources or necessitating further browser configurations.

To illustrate the concept of server augmentation with endpoints, consider a web service hosted at the domain or server myDailyTasks.com, which offers a task management system with a list of daily to-do tasks. The service may provide HTTP endpoints for Create, Read, Update, Delete (CRUD) operations. The web application programming interface (API) may define the following endpoint (i.e., routes) with their corresponding HTTP methods: 1) GET /api/tasks to retrieve all tasks; 2) POST /api/tasks to create a new task; 3) PUT /api/tasks/:id to update an existing task identified by its id; and 4) DELETE /api/tasks/:id to remove an existing task identified by its id.

The proxy may inject content such as "<script src="/addin456/addScript.js"></script>" into an HTTP response received from myDailyTasks.com. Upon processing this line, the client (e.g., a web browser) is programmed to presume that /addin456/addScript.js is a resource located at the same domain as myDailyTasks.com, although in reality, such an endpoint does not exist on the server. Stated another way, the client identifies the endpoint as a relative path with respect to the web server domain such that the client determines that the endpoint is available from the web server, where the endpoint is actually unavailable from the web server. When the proxy receives a subsequent request for /addin456/addScript.js, the proxy intercepts this request, identifies the sub-string "addin456" as previously generated by the proxy, and serves (e.g., provides to the client) the script addScript.js from its own resources, effectively masquerading as the originating server. The sub-string "addin456" is an indication to the proxy that it is to process the request and to not forward the request to the target.

As such, via the proxy, this approach can be used to add or modify functionality (e.g., augment the functionality of a web server) on the client-side without the need for the server to host or serve the actual script, maintaining the illusion of a single-source origin for all resources. Additionally, content can be seamlessly injected into a web page circumventing CORS issues or browser security warnings. Content can be retrieved asynchronously so that a web page can be loaded without delay, unlike inline modifications that may impede the rendering process. The absence of a requirement for external network resources translates to faster content fetch times and bandwidth conservation. Moreover, the techniques described herein negate the necessity for additional open ports on a client, which effectively minimizes the potential attack surface for malicious activities. Opening ports might otherwise be required for listening to incoming requests that require special handling.

The description herein may include statements similar to "the client may perform a first action" (e.g., the client may transmit a request) or "the proxy may perform a second action" (e.g., the proxy may determine whether to transmit the request or the proxy may modify the response). Such statements can be interpreted as logic, configuration, or programming of the client and logic, configuration, or programming of the proxy enabling the specified actions to be executed. The client and the proxy may include executable instructions for performing the specified actions.

Augmenting targets with endpoints as described herein is provided on an opt-in basis, ensuring that users have control over their participation. Participation in utilizing these capabilities requires explicit user consent, as they are offered strictly on an opt-in only basis to prioritize user privacy. For users within an organizational context, the activation and use of these capabilities may be governed by employer consent, wherein the employer opts-in on behalf of their employees to enhance operational efficiency while maintaining a commitment to privacy standards.

FIG. 1 is a block diagram of an example of a computing device 1000. The computing device 1000 may implement, execute, or perform, one or more aspects of the methods and techniques described herein. The computing device 1000 includes a data interface 1100, a processor 1200, memory 1300, a power component 1400, a user interface 1500, and a bus 1600 (collectively, components of the computing device 1000). Although shown as a distinct unit, one or more of the components of the computing device 1000 may be integrated into respective distinct physical units. For example, the processor 1200 may be integrated in a first physical unit and the user interface 1500 may be integrated in a second physical unit. The computing device 1000 may include aspects or components not expressly shown in FIG. 1, such as an enclosure or one or more sensors.

In some implementations, the computing device 1000 is a stationary device, such as a personal computer (PC), a server, a workstation, a minicomputer, or a mainframe computer. In some implementations, the computing device 1000 is a mobile device, such as a mobile telephone, a personal digital assistant (PDA), a laptop, or a tablet computer.

The data interface 1100 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 1100 may include, or may be, a transceiver. Although not shown separately in FIG. 1, the data interface 1100 may include, or may be operatively coupled with, an antenna for wireless electronic communication. Although not shown separately in FIG. 1, the data interface 1100 may include, or may be operatively coupled with, a wired electronic communication port, such as an Ethernet port, a serial port, or another wired port, that may interface with, or may be operatively coupled to, a wired electronic communication medium. In some implementations, the data interface 1100 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 1000, or one or more of the components thereof, and one or more external electronic or computing devices. Although shown as one unit in FIG. 1, the data interface 1100 may include multiple physical components, such as a wired data interface and a wireless data interface.

For example, the computing device 1000 may electronically communicate, such as transmit, receive, or exchange computer accessible data, with one or more other computing devices via one or more wired or wireless communications links, or connections, such as via a network, using the data interface 1100, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 1200 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 1200 is implemented as a central processing unit (CPU), such as a microprocessor. In some implementations, the processor 1200 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 1200 includes one or more processing units. A processing unit may include one or more processing cores. The computing device 1000 may include multiple physical or virtual processing units (collectively, the processor 1200), which may be interconnected, such as via wired, or hardwired, connections, via wireless connections, or via a combination of wired and wireless connections. In some implementations, the processor 1200 is implemented in a distributed configuration including multiple physical devices or units that may be coupled directly or across a network. The processor 1200 includes internal memory (not expressly shown), such as a cache, a buffer, a register, or a combination thereof, for internal storage of data, such as operative data, instructions, or both. For example, the processor 1200 may read data from the memory 1300 into the internal memory (not shown) for processing.

The memory 1300 is a non-transitory computer-usable or computer-readable medium, implemented as a tangible device or component of a device. The memory 1300 contains, stores, communicates, transports, or a combination thereof, data, such as operative data, instructions, or both. For example, the memory 1300 stores an operating system of the computing device 1000, or a portion thereof. The memory 1300 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 1300 may include non-volatile memory, such as a disk drive, or another form of non-volatile memory capable of persistent electronic data storage, such as in the absence of an active power supply. The memory 1300 may include, or may be implemented as, one or more physical or logical units.

The memory 1300 stores executable instructions or data, such as application data, an operating system, or a combination thereof, for access, such as read access, write access, or both, by the other components of the computing device 1000, such as by the processor 1200. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 1300 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 1400 obtains, stores, or both, power, or energy, used by the components of the computing device 1000 to operate. The power component 1400 may be implemented as a general-purpose alternating-current (AC) electric power supply, or as a power supply interface, such as an interface to a household power source or other external power distribution system. In some implementations, the power component 1400 may be implemented as a single use battery or a rechargeable battery such that the computing device 1000 operates, or partially operates, independently of an external power distribution system. For example, the power component 1400 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 1000.

The user interface 1500 includes one or more units or devices for interfacing with an operator of the computing device 1000, such as a human user. In some implementations, the user interface 1500 obtains, receives, captures, detects, or otherwise accesses, data representing user input to the computing device, such as via physical interaction with the computing device 1000. In some implementations, the user interface 1500 outputs, presents, displays, or otherwise makes available information, such as to an operator of the computing device 1000, such as a human user.

The user interface 1500 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a physical user interface 1500 may be omitted, or absent, from the computing device 1000.

The bus 1600 distributes or transports data, power, or both among the components of the computing device 1000 such that the components of the computing device are operatively connected. Although the bus 1600 is shown as one component in FIG. 1, the computing device 1000 may include multiple busses, which may be connected, such as via bridges, controllers, or adapters. For example, the bus 1600 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 1000.

Although not shown separately in FIG. 1, data interface 1100, the power component 1400, or the user interface 1500 may include internal memory, such as an internal buffer or register.

Although an example of a configuration of the computing device 1000 is shown in FIG. 1, other configurations may be used. One or more of the components of the computing device 1000 shown in FIG. 1 may be omitted, or absent, from the computing device 1000 or may be combined or integrated. For example, the memory 1300, or a portion thereof, and the processor 1200 may be combined, such as by using a system on a chip design.

Figure 2:
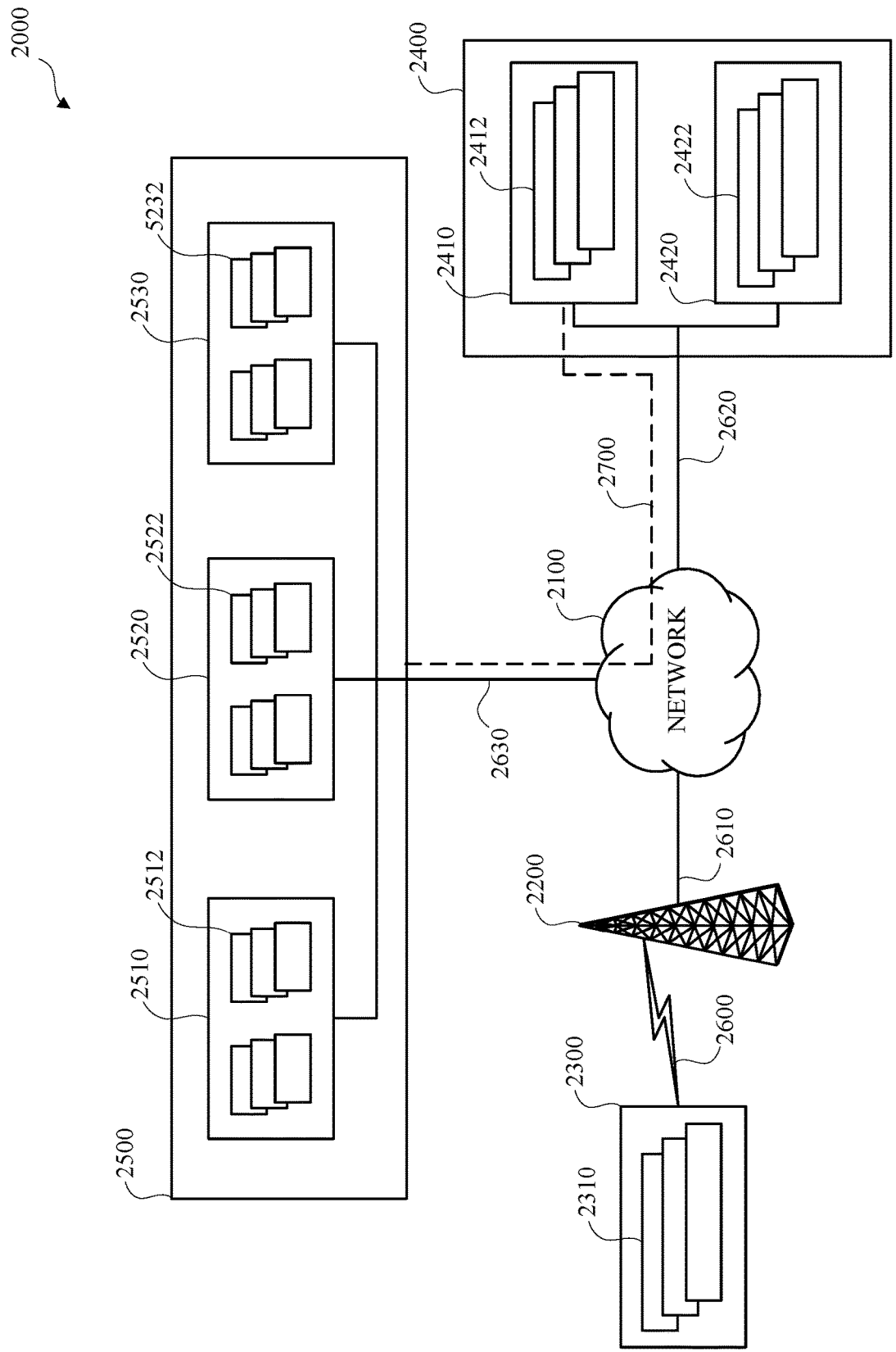
FIG. 2 is a block diagram of an example of a computing and communications system.

FIG. 2 is a diagram of an example of a computing and communications system 2000. The computing and communications system 2000 includes a first network 2100, an access point 2200, a first computing and communications device 2300, a second network 2400, and a third network 2500. The second network 2400 includes a second computing and communications device 2410 and a third computing and communications device 2420. The third network 2500 includes a fourth computing and communications device 2510, a fifth computing and communications device 2520, and a sixth computing and communications device 2530. Other configurations, including fewer or more computing and communications devices, fewer or more networks, and fewer or more access points, may be used.

One or more of the networks 2100, 2400, 2500 may be, or may include, a local area network (LAN), wide area network (WAN), virtual private network (VPN), a mobile or cellular telephone network, the Internet, or any other means of electronic communication. The networks 2100, 2400, 2500 respectively transmit, receive, convey, carry, or exchange wired or wireless electronic communications using one or more communications protocols, or combinations of communications protocols, the transmission control protocol (TCP), the user datagram protocol (UDP), the IP, the real-time transport protocol (RTP), the HTTP, or a combination thereof. For example, a respective network 2100, 2400, 2500, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 2200 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 2200 is shown as a single unit, an access point can include any number of interconnected elements. Although one access point 2200 is shown, fewer or more access points may be used. The access point 2200 may communicate with other communicating devices via wired or wireless electronic communications links or via a sequence of such links.

As shown, the access point 2200 communicates via a first communications link 2600 with the first computing and communications device 2300. Although the first communications link 2600 is shown as wireless, the first communications link 2600 may be implemented as, or may include, one or more wired or wireless electronic communications links or a sequence of such links, which may include parallel communications links for multipath communications.

As shown, the access point 2200 communicates via a second communications link 2610 with the first network 2100. Although the second communications link 2610 is shown as wired, the second communications link 2610 may be implemented as, or may include, one or more wired or wireless electronic communications links or a sequence of such links, which may include parallel communications links for multipath communications.

As shown, the first network 2100 communicates with the second network 2400 via a third communications link 2620. Although the third communications link 2620 is shown as wired, the third communications link 2620 may be implemented as, or may include, one or more wired or wireless electronic communications links or a sequence of such links, which may include parallel communications links for multipath communications.

As shown, the first network 2100 communicates with the third network 2500 via a fourth communications link 2630. Although the fourth communications link 2630 is shown as wired, the fourth communications link 2630 may be implemented as, or may include, one or more wired or wireless electronic communications links or a sequence of such links, which may include parallel communications links for multipath communications.

The computing and communications devices 2300, 2410, 2420, 2510, 2520, 2530 are, respectively, computing devices, such as the computing device 1000 shown in FIG. 1. For example, the first computing and communications device 2300 may be a user device, such as a mobile computing device or a smartphone, the second computing and communications device 2410 may be a user device, such as a laptop, the third computing and communications device 2420 may be a user device, such as a desktop, the fourth computing and communications device 2510 may be a server, such as a database server, the fifth computing and communications device 2520 may be a server, such as a cluster or a mainframe, and the sixth computing and communications device 2530 may be a server, such as a web server.

The computing and communications devices 2300, 2410, 2420, 2510, 2520, 2530 communicate, or exchange data, such as voice communications, audio communications, data communications, video communications, messaging communications, broadcast communications, or a combination thereof, with one or more of the other computing and communications devices 2300, 2410, 2420, 2510, 2520, 2530 respectively using one or more of the networks 2100, 2400, 2500, which may include communicating using the access point 2200, via one or more of the communications links 2600, 2610, 2620, 2630.

For example, the first computing and communications device 2300 may communicate with the second computing and communications device 2410, the third computing and communications device 2420, or both, via the first communications link 2600, the access point 2200, the second communications link 2610, the network 2100, the third communications link 2620, and the second network 2400. The first computing and communications device 2300 may communicate with one or more of the third computing and communications device 2510, the fourth computing and communications device 2520, the fifth computing and communications device 2520, via the first communications link 2600, the access point 2200, the second communications link 2610, the network 2100, the fourth communications link 2630, and the third network 2500.

For simplicity and clarity, the sequence of communications links, access points, networks, and other communications devices between a sending communicating device and a receiving communicating device may be referred to herein as a communications path. For example, the first computing and communications device 2300 may send data to the second computing and communications device 2410 via a first communications path, or via a combination of communications paths including the first communications path, and the second computing and communications device 2410 may send data to the first computing and communications device 2300 via the first communications path, via a second communications path, or via a combination of communications paths, which may include the first communications path.

The first computing and communications device 2300 includes, such as executes, performs, or operates, one or more applications, or services, 2310. The second computing and communications device 2410 includes, such as executes, performs, or operates, one or more applications, or services, 2412. The third computing and communications device 2420 includes, such as executes, performs, or operates, one or more applications, or services, 2422. The fourth computing and communications device 2510 includes, such as stores, hosts, executes, performs, or operates, one or more documents, applications, or services, 2512. The fifth computing and communications device 2520 includes, such as stores, hosts, executes, performs, or operates, one or more documents, applications, or services, 2522. The sixth computing and communications device 2530 includes, such as stores, hosts, executes, performs, or operates, one or more documents, applications, or services, 2532.

In some implementations, one or more of the computing and communications devices 2300, 2410, 2420, 2510, 2520, 2530 may communicate with one or more other computing and communications devices 2300, 2410, 2420, 2510, 2520, 2530, or with one or more of the networks 2400, 2500, via a virtual private network. For example, the second computing and communications device 2410 is shown as communicating with the third network 2500, and therefore with one or more of the computing and communications devices 2510, 2520, 2530 in the third network 2500, via a virtual private network 2700, which is shown using a broken line to indicate that the virtual private network 2700 uses the first network 2100, the third communications link 2620, and the fourth communications link 2630.

In some implementations, two or more of the computing and communications devices 2300, 2410, 2420, 2510, 2520, 2530 may be in a distributed, or clustered, configuration. For example, the third computing and communications device 2510, the fourth computing and communications device 2520, and the fifth computing and communications device 2520 may, respectively, be elements, or nodes, in a distributed configuration.

In some implementations, one or more of the computing and communications devices 2300, 2410, 2420, 2510, 2520, 2530 may be a virtual device. For example, the third computing and communications device 2510, the fourth computing and communications device 2520, and the fifth computing and communications device 2520 may, respectively, be virtual devices operating on shared physical resources.

Figure 3:
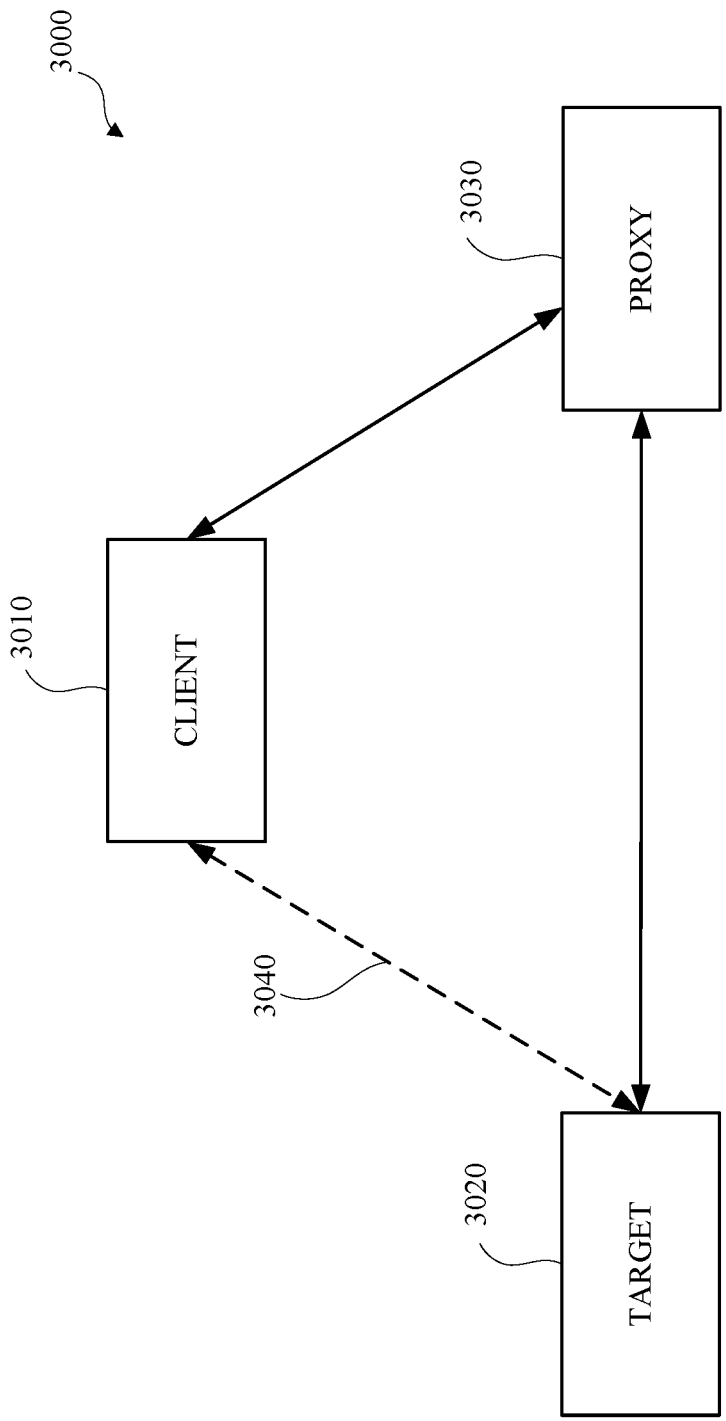
FIG. 3 is a block diagram of a system where augmenting web servers with endpoints can be implemented.

FIG. 3 is a block diagram of a system 3000 where augmenting web servers with endpoints can be implemented. The system 3000 includes a client 3010, a target 3020, and a proxy 3030, which are communicatively connected.

Each of the client 3010, the target 3020, and the proxy 3030, may be generically referred to as a system constituent. A system constituent (i.e., one of the client 3010, the target 3020, or the proxy 3030) refers to one or both of a device or an application. Where a system constituent is or refers to a device, the component can comprise a computing system, which can include one or more computing devices (e.g., one or more of the computing device 1000 of FIG. 1). Where a system constituent instead is or refers to an application, the component can be an instance of software running on a device (e.g., a computing device). In some implementations, a system constituent can be implemented as a single physical unit or as a combination of physical units. In some implementations, a single physical unit can include multiple components.

The client 3010 can be a client device, such as the first computing and communications device 2300 shown in FIG. 2, or a system that includes a client device. The target 3020 can be a server device, such as the second computing and communications device 2410 or the third computing and communications device 2420 shown in FIG. 2, or a system that includes one or more server device a typical interaction, the client 3010 may transmit a request to the target 3020 to retrieve content, for the target 3020 to perform an action, or the like. Requests transmitted by the client are illustrated with a dashed line 3040 to illustrate that the requests are intercepted by the proxy 3030 prior to transmission to the target 3020. The target 3020 processes the request and transmits content back to the client 3010.

The client 3010 may be configured to use the proxy 3030. For the client 3010 to use the proxy 3030, the client 3010 may be configured with proxy settings (e.g., an internet protocol (IP) address, a port number, or the like) of the proxy 3030. In an example, network settings included or associated with the client 3010 may include the proxy settings. In an example, the proxy settings may be configured in the client application itself. The client 3010 may be a web browser and configuration the proxy settings may be possible via the client 3010. In another example, the client may be automatically configured, such as via an automatic configuration script or protocol (such as Web Proxy Auto-Discovery Protocol (WPAD)) to discover and apply the proxy settings automatically.

The proxy 3030 can be any type of intermediary between the client 3010 and the target 3020 and that can be utilized for web server augmentation. The proxy 3030 can be a web browser extension. The proxy 3030 can be an HTTP proxy implemented at (e.g., deployed at and executing at) the client 3010. The proxy 3030 can be a remote forward proxy located within or outside the network of the device 3010. The proxy 3030 can be either a transparent proxy or a typical (e.g., non-transparent) HTTP proxy. The proxy 3030 may simultaneously (e.g., concurrently) act as an intermediary between one or more clients and one or more corresponding targets.

The client 3010 may transmit, or may be configured to transmit, requests to the target 3020 through the proxy 3030. As such, requests initiating from the client 3010 to the target 3020 can be routed through the proxy 3030. With respect to some requests, the proxy 3030 may forward these requests to the target 3020 on behalf of the client 3010. When the target 3020 responds, the proxy 3030 receives the response (e.g., the data of the response) first, may modify and/or inspect the data, and forwards the data (modified or otherwise) to the client 3010. With respect to other requests, the proxy 3030 may itself process such requests without forwarding them to the target 3020.

If a request received by the proxy 3030 includes an indication that the proxy 3030 is to process the request, then the proxy 3030 processes the request without transmitting the request to the target 3020. The indication may be injected by the proxy 3030 by modifying a response received from the target 3020. In some implementations, a request received from the client 3010 may include a proxy-handing indication and/or a proxy-modifying indication. A proxy-handling indication in a request causes the proxy to handle the request without transmitting the request to the target 3020. That is, the proxy 3030 generates and transmits a response (response data) to the client 3010. A proxy-modifying request causes the proxy 3030 to modify the request and transmit the modified request to the client 3010. Proxy-handing indications and proxy-modifying indications can be injected by the proxy 3030 into responses received from the target 3020 prior to transmitting these responses to the client 3010.

The proxy 3030 can have the capacity to inspect and modify HTTP secure (HTTPS) payloads in TLS connections such that the proxy 3030 is capable of handling plain HTTP and HTTPS data. In such cases where the requests from the client 3010 are transmitted over a secure protocol, such as those encrypted with, for example, HTTPS, the proxy 3030 can be configured to perform SSL/TLS interception (e.g., decryption and re-encryption), such as to inspect or modify the content. To implement TLS interception, the proxy 3030 is configured to establish a certificate trust with the client 3010. This can involve the client 3010 trusting a self-signed certificate authority created by the proxy 3030, or recognizing pre-generated certificates for specific websites. Such certificates can be included in certificate authorities (not shown) of the system 3000 or a certificate store (not shown) of the client 3010.

With the trusted certificates in place, the proxy 3030 is able to initiate separate TLS sessions with the client 3010 and the target 3020. This allows the proxy 3030 to decrypt, inspect, and modify HTTPS data that is usually encrypted. To direct the requests from the client 3010 (e.g., to direct web browser traffic) through the proxy 3030, network settings can be adjusted on the operating system of the client 3010 or the client 3010 itself (e.g., web browser), or low-level network interception techniques, such as kernel modules or firewall rules, can be utilized.

The proxy 3030 acts as an intermediary that decrypts incoming encrypted data from the client 3010, inspects or augments the data as necessary, and then re-encrypts the data before sending it to the target 3020. This process starts with the proxy 3030 accepting a TCP connection from the client 3010 (e.g., from a web browser) and performing a TLS handshake using a certificate trusted by the client 3010. After establishing the connection to the target 3020 that the client 3010 intended to reach, and ensuring that the TLS handshakes on both ends are successful and the certificates are validated, the communication proceeds through the encrypted tunnels. The response from the target 3020 undergoes a similar process in reverse: the proxy 3030 decrypts the data received from the target 3020, inspects or modifies the data, and re-encrypts the data before transmitting it to the client 3010.

The system 3000 enables the proxy 3030 to inject additional resources or perform security functions, such as filtering out malicious content or injecting custom stylesheets, even when the original content is encrypted.

FIG. 4. is an example of a web page 4000 that illustrates loading a resource from a source that is different from the origin of the web page. The web page 4000 illustrates content received from a target in response to a request transmitted from a client. The web page 4000 illustrates that the target is at the domain EXAMPLE.COM. The web page 4000 is in the HTML format.

The web page 4000 includes a reference to a resource 4010 that is to be retrieved from the origin domain EXAMPLE.COM of the web page 4000 and from the specific endpoint (e.g., file path, in this case) /STYLES/ORIGINAL.CSS. The web page 4000 also includes a resource 4020 that is to be retrieved from a different origin than the origin of the web page 4000. Specifically, the resource 4020 is to be retrieved from the endpoint /STYLES/ADBLOCKER.CSS from the domain ANOT- HERDOMAIN.COM. In this case, the resources 4010 and 4020 are cascading style sheets. However, the disclosure is not limited to any particular types of resources or endpoints. The resource 4020 may be injected into the web page 4000 by an intermediary (e.g., a proxy). That is, the content (e.g., web page), as received at the intermediary from the target, does not include lines 4030. However, the lines 4030 may be injected (e.g., added, inserted, etc.) into the content by the intermediary.

A challenge encountered in such conventional technique of code injection is the enforcement of Cross-Origin Resource Sharing (CORS) policies. CORS is a security mechanism implemented by web browsers to control access to resources between different origins. Browsers enforce or implement Same-Origin Policy (SOP) as a security measure to prevent malicious websites from reading sensitive data from another domain without permission. For example, under SOP, scripts on a web page are typically restricted to making requests to resources within the same domain as the one from which the web page is obtained unless the external domain provides explicit permission through CORS headers.

CORS requires that servers respond with specific headers that dictate whether a client (e.g., a web browser) should allow a resource to be shared with a requesting domain. This is critical for maintaining web security; however, it also introduces complexity in the development process. To successfully inject external resources from different domains into a webpage, developers must ensure that the servers hosting these resources are configured to return the correct CORS headers. This configuration can be complex and error-prone, potentially resulting in the failure to load resources and subsequent issues in application functionality.

As mentioned, the first <link> tag of the resource 4010 points to a stylesheet (e.g., ORIGINAL.CSS) that is hosted on the same domain as the web page 4000 (e.g., EXAMPLE.COM). This stylesheet may be intended to provide base styling for the web page 4000. When processing the web page 4000 for rendering, and upon encountering the line corresponding to the resource 4010, the client issues a request (e.g., a GET request) to the specified Uniform Resource Locator (URL) (HTTP://EXAMPLE.COM/STYLES/ORIGINAL.CSS) to fetch the stylesheet and apply the CSS rules defined within it to the current page. Since this request is made to the same origin (i.e., EXAMPLE.COM), it is not affected by CORS policies and is loaded and applied by the client without any issues.

In contrast, the client (e.g., a web browser) attempts to load the resource 4020 from a different domain (e.g., ANOTHERDOMAINCOM). As described previously, if ANOTHERDOMAINCOM is not configured to set the appropriate CORS headers to allow cross-origin requests from EXAMPLE.COM, the security mechanisms of the client would prevent this stylesheet from being applied due to CORS restrictions. In the absence of CORS headers, the client may retrieve the resource 4020 but will not apply it to the document to enforce the same-origin policy.

Figure 5:
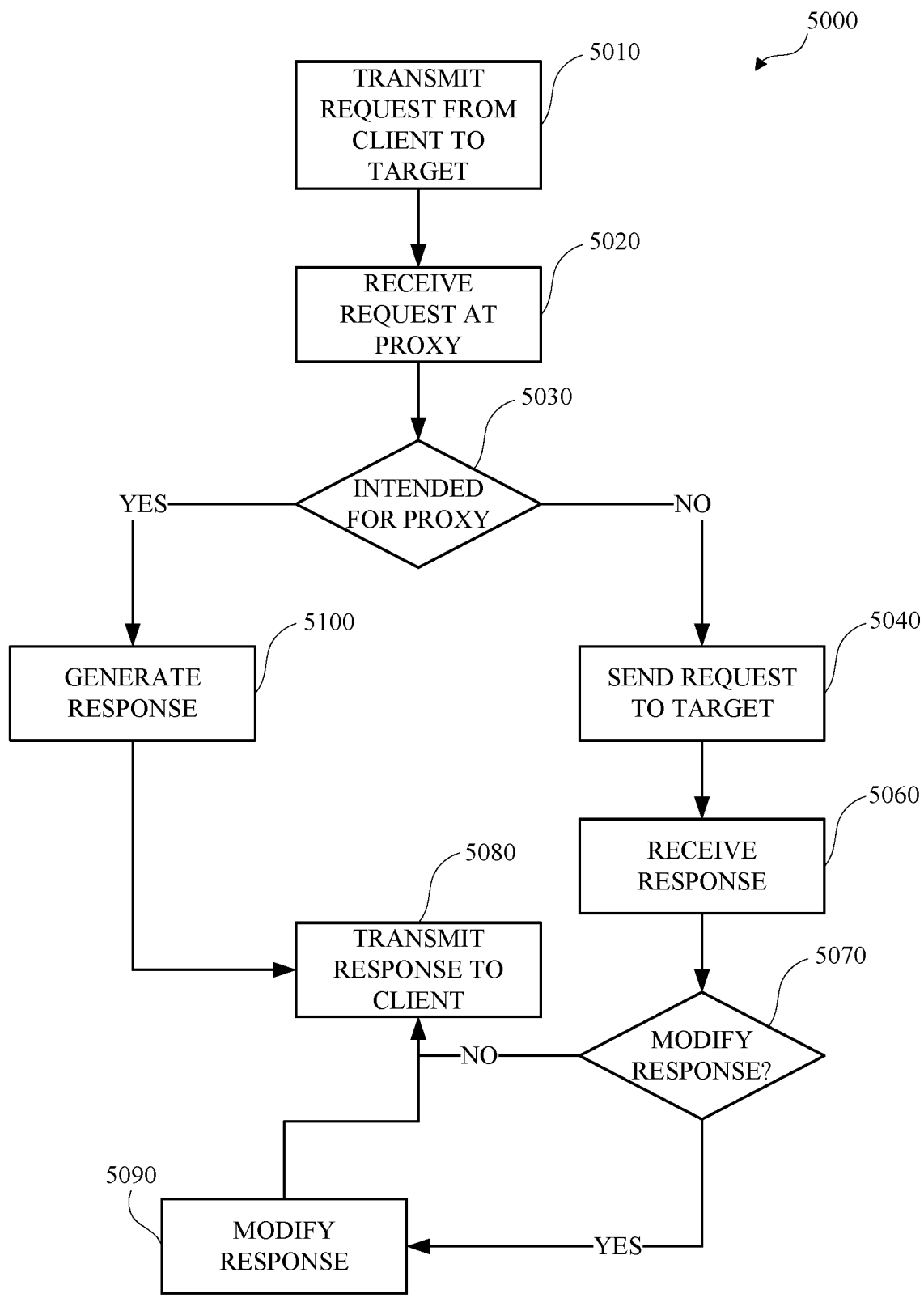
FIG. 5 is a flowchart of a technique for augmenting a server with endpoints.

FIG. 5 is a flowchart of a technique 5000 for augmenting a server with endpoints. The technique 5000 can be implemented, for example, as a software program that may be executed by computing devices such as the computing device 1000 of FIG. 1. The software program can include machine-readable instructions that may be stored in a memory such as the memory 1300, and that, when executed by a processor, such as the processor 1200, may cause the computing device to perform the technique 5000. The technique 5000 may be implemented at least in part by an intermediary, such as the proxy 3030 shown in FIG. 3. The technique 5000 can be implemented using specialized hardware or firmware. Multiple processors, memories, or both, may be used.

At 5010, a client transmits a request intended for a target. The client can be the client 3010 of FIG. 3. As such, the client can be an application executing at a computing device, which may be a user device. The application can be a web browser. The request can be an HTTP request. The target can be the target 3020 of FIG. 3. At 5020, the request is received at the proxy. The proxy acts as an intermediary between the client and the target. More accurately, the proxy intercepts the request, which the client intended to transmit to the target.

At 5030, the proxy determines whether the request is in fact intended for the proxy itself. This process involves the proxy identifying certain markers or indicators within the request (e.g., a proxy-handling indication) that signal the proxy to intercept and manage the request internally. Essentially, the presence of these indicators means the proxy should not forward the request to the intended target server but instead handle the request itself. The request may be a request for a resource, a request to perform an action, or some other request. The request may include an indication (e.g., a proxy-handing indication) usable by the proxy in determining that the proxy is to handle the request instead of transmitting the request to the target. FIG. 9 illustrates examples of the proxy determining whether the request is intended for the proxy.

Figure 6:
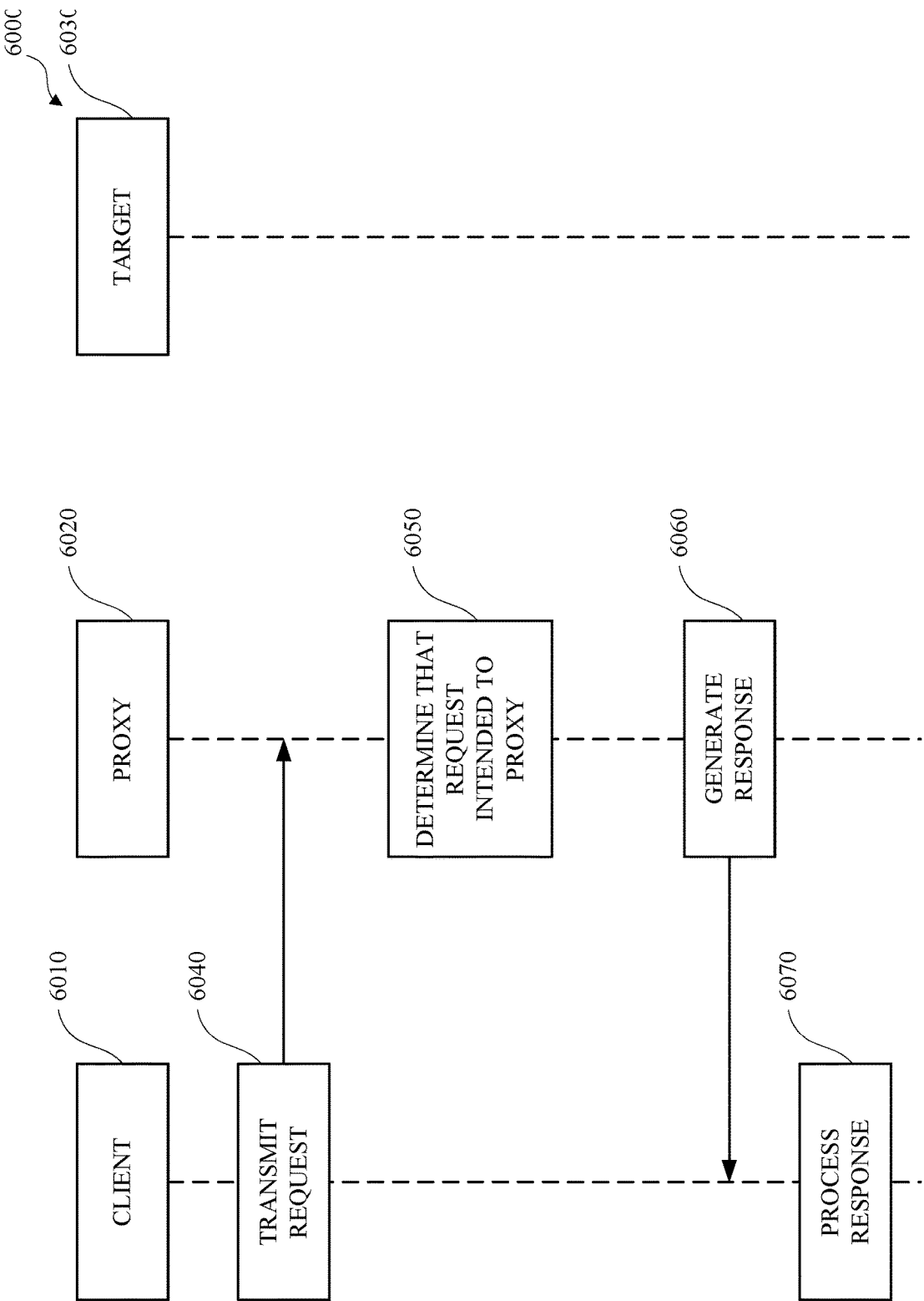
FIG. 6 is an example of an interaction diagram for processing a request by a proxy.
Figure 7:
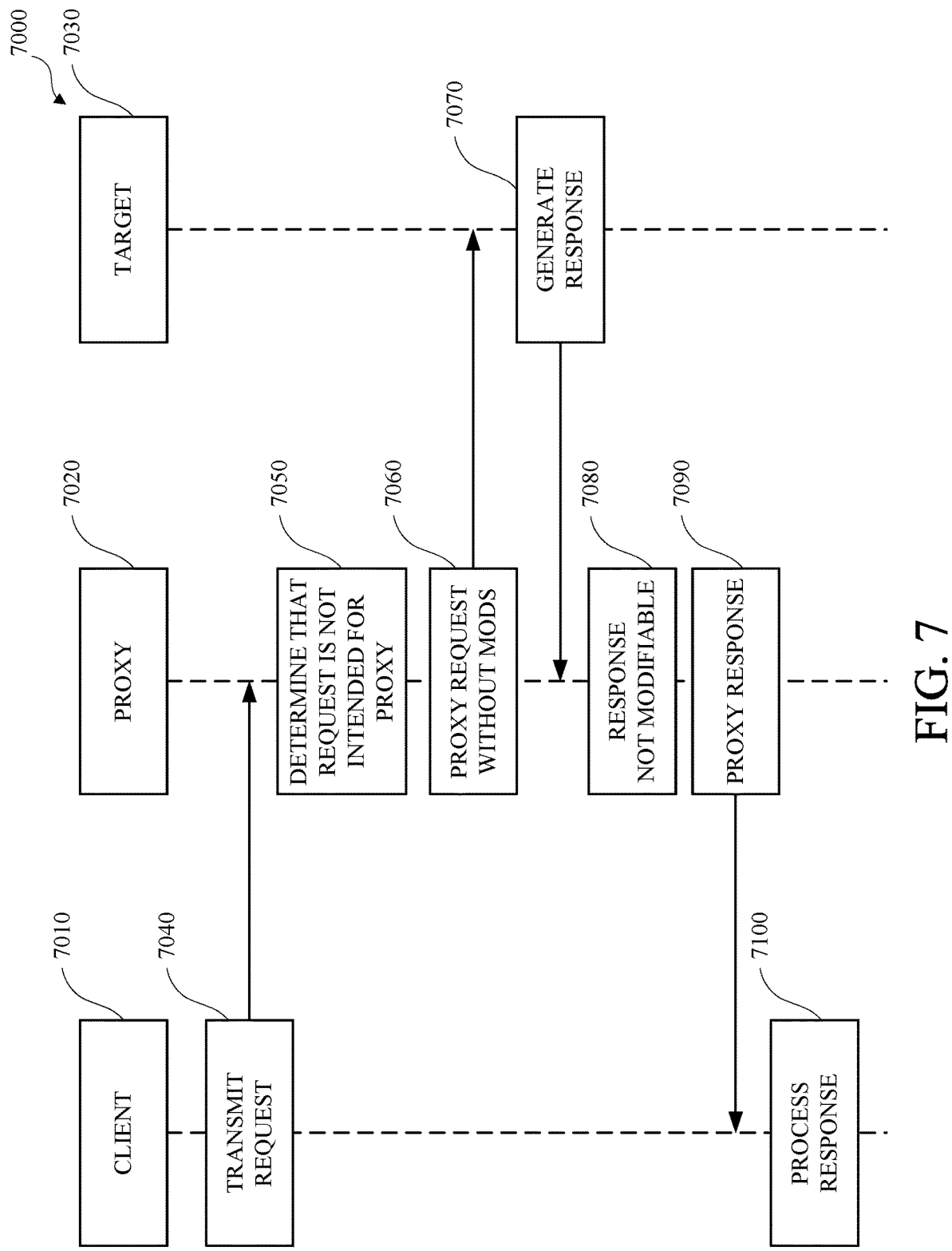
FIG. 7 is an example of an interaction diagram where a request from a client is proxied.

If the proxy determines (such as based on a determination that the request includes the indication) that the request is intended for the proxy itself, then the technique 5000 proceeds to 5100. FIG. 6 is an example of an interaction diagram for processing a request by the proxy. If it is determined (such a based on the absence of the indication) that the proxy is not to handle the request, then the technique 5000 proceeds to 5040. FIG. 7 is an example of an interaction diagram where a request is proxied.

Figure 8:
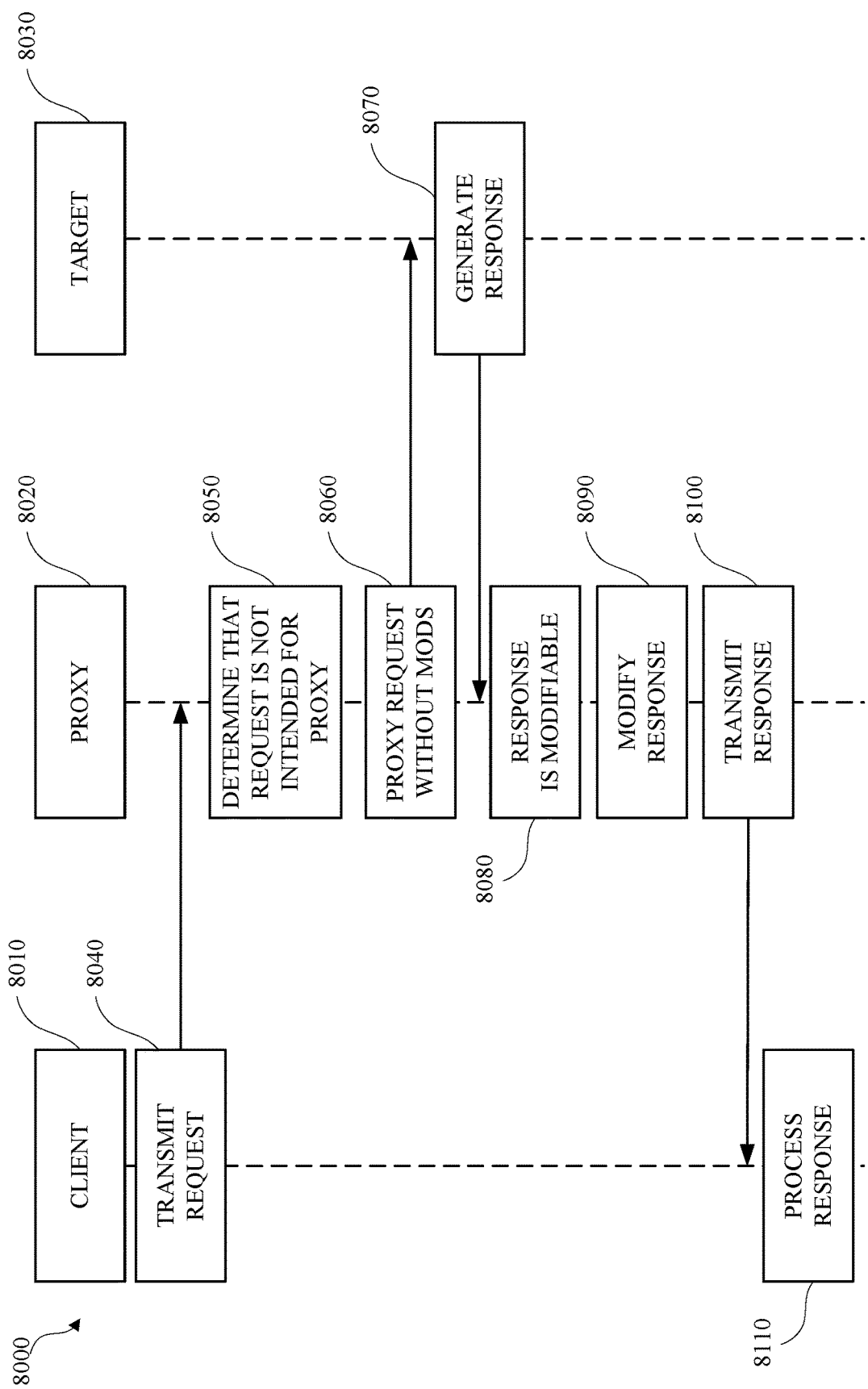
FIG. 8 is an interaction diagram for modifying a response received from a target.

At 5040, the proxy forwards the request to the target. At 5060, the proxy receives the response from the target. At 5070, the proxy determines whether the response is a modifiable response. If the response is a modifiable response, then the proxy modifies the response prior to transmitting the response (i.e., the modified response) to the client. If no modification is needed, the proxy transmits the response to the client, at 5080. If modifications are needed, then the proxy modifies the response, at 5090, and then proceeds to 5080 to transmit the response (the modified response in this case) to the client. FIG. 8 is an interaction diagram for modifying a response received from a target.

A modifiable response is one that the proxy determines should be modified prior to transmission to the client. Modifying the response includes injecting content into the response. As described herein, the injected content may include executable (e.g., interpretable) instructions executable by the client; endpoints that augment the target; and/or some other content. As such, the injected content may be a resource (e.g., a request for or a link to a resource) interpretable by the client as being available at (e.g., addressed to) the target. In an example, if the response is a web page (e.g., is or includes HTML content), then the proxy determines that the response is modifiable. On the other hand, if the response is a resource, such as an image, a CSS file, or the like, then the proxy 7020 determines that it is not a modifiable response. The proxy may be configured to perform HTML content augmentation, JavaScript content enhancement, and/or some other type of response handling.

For HTML content augmentation, the proxy may be configured to inject additional CSS or scripts in the response. The proxy may determine that a response is modifiable if the content type of the response aligns with HTML, which may be determined through the associated Content-Type header explicitly indicating HTML content (e.g., 'text/html'). Upon this determination, the proxy may parse the HTML payload to locate appropriate insertion points for CSS or scripts. Should the parsing mechanism encounter data inconsistent with standard HTML format—suggestive of erroneous Content-Type declaration—the proxy may infer that an incorrect specification has occurred.

Regarding JavaScript content enhancement, the proxy may be configured to adjust JavaScript within the response that dictates dynamic webpage elements and interactions. This may include modifications to scripts, such as those that orchestrate resource retrieval through programmatic requests. The proxy may identify a response as being a modifiable response based on the Content-Type header indicating, for example, 'text/javascript.' Given the absence of a universal convention within JavaScript for resource URL specification, script modifications necessitate customization respective to the intricacies of individual websites or scripts.

FIG. 6 is an example of an interaction diagram 6000 for processing a request by a proxy. The interaction diagram 6000 includes a client 6010, a proxy 6020, and a target 6030, which can be, respectively, the client 3010, the proxy 3030, and the target 3020 of FIG. 3. The proxy 6020 can be a transparent proxy. In an example, the transparent proxy can be implemented at the client 3010. That is, the proxy 3030 can be deployed at and is executed by the same computing device as the client 3010. In another example, the client 3010 and the proxy 3030 can be implemented at different computing devices.

At 6040, the client 6010 generates a request for a resource. The request includes an indication (e.g., a proxy-handing indication) that the request is intended for the proxy 6020. At 6050, the proxy 6020 receives the request and determines that the request includes the indication that causes the proxy 6020 to not transmit the request to the target 6030 but to handle the request itself.

At 6060, the proxy 6020 generates a response for the client 6010. At 6070, the response is received and processed by the client 6010. In an example, processing the request includes rendering or outputting the response or a portion thereof on a user interface (e.g., a display).

FIG. 7 is an example of an interaction diagram 7000 where a request from a client is proxied. That is, the interaction diagram 7000 illustrates a process for handling a web request via a proxy. The interaction diagram 7000 includes a client 7010, a proxy 7020, and a target 7030, which may be, respectively, the client 3010, the proxy 3030, and the target 3020 of FIG. 3. Similar to the proxy 6020 of FIG. 6, the proxy 7020 may operate as a transparent proxy and may be located either on the same computing device as the client 7010 or on a separate device.

At 7040, the client 7010 transmits a request (e.g., an HTTP or an HTTPS request). The request is directed (e.g., targeted to) the target 7030. The request is received at the proxy 7020. At 7050, the proxy 7020 determines that the proxy 7020 is not to handle the request. That is, the proxy 7020 determines that the request does not include an indication that the proxy 7020 is to handle the request instead of transmitting the request to the target 7030. As such, at 7060, the proxy 7020 forwards the request to the target 7030 without modifications. This step illustrates the role of the proxy 7020 in routing traffic appropriately based on the intended target of the request. In another example, the request may include a proxy-handling indication. In such a case, the proxy 7030 may modify (e.g., add content to or modify content of) the request prior to transmitting the request to the target 7030.

At 7070, the target 7030 processes the incoming request and generates an appropriate response, which it transmits back to the initiator of the request (e.g., the proxy 7020). At 7080, the proxy 7020 determines that the received response is not a modifiable response. As such, the proxy 7020 does not modify the response and, at 7090, transmits the response, without modifications, to the client 7010. At step 7100, the client 7010 processes the response which may include displaying content through a user interface, executing embedded scripts, initiating subsequent requests or actions predicated on the response content, or some other processing.

FIG. 8 is an interaction diagram 8000 for modifying a response received from a target. This interaction diagram 8000 includes a client 8010, a proxy 8020, and a target 8030, which can be, respectively, the client 3010, the proxy 3030, and the target 3020 of FIG. 3, respectively. The proxy 8020 may function as a transparent proxy, capable of being deployed on either the same device as the client 8010 or on a distinct device.

The interaction diagram includes steps 8040 to 8070 and 8110, which can be similar to steps 7040 to 7070 and 7100 of FIG. 7, respectively, and descriptions therefor are omitted for brevity. At 8080, the proxy 8020 determines that the response is modifiable. At 8090, the proxy 8020 modifies the response accordingly before transmission. Modifying the response can include altering data, adding headers, or injecting content. Modifying the content may be performed for compliance with security policies, to add performance enhancements, or additional functionality. At 8100, the proxy 8020 transmits the response to the client 8010.

FIG. 9 illustrates an example of injected content 9000 that augments a target (e.g., a web server) with endpoints. The injected content 9000 illustrates a snippet of script executable by a client (e.g., a web browser). The injected content 9000 may be added by an intermediary (e.g., a proxy) between the client and the target, such as the proxy 3030 of FIG. 3 or the proxy 8020 of FIG. 8. For example, the injected content 9000 may be added by the proxy 8020 at step 8090 of FIG. 8. The injected content 9000 is a JavaScript code snippet that includes functions designed to interact with a proxy service for the purpose of link evaluation. The injected content 9000 may be part of a security feature that checks the safety of hyperlinks on a webpage by consulting a proxy service. However, the disclosure herein is not limited to or by the injected content 9000 or any particular programming or scripting language.

The injected content 9000 includes a function 9010 (e.g., fetch_link_data( )), which receives a passed element as a parameter. The function 9010 asynchronously fetches data about a specific hyperlink (e.g., an HTML <a> anchor element) from a proxy service. The function 9010 retrieves the href attribute from the passed element, which is the URL the link points to. At a line 9020, the function 9010 constructs a request URL to the proxy endpoint, appending the URL-encoded link as a query parameter. The function 9010 then makes a fetch call to this constructed URL, awaiting the response from the proxy.

The endpoint /FORME990011/CHECK_LINK causes the proxy to check whether the link is safe to access. From the perspective of the client, this endpoint is considered to be a relative endpoint available from the same target that the webpage itself originated. Thus, such a request is interpretable by the client as being addressed to the target. However, when the proxy receives such a request, the proxy determines that the request includes an indication that the indication that the proxy is to handle the request. In this case, the indication is the "FORME990011." As such, the endpoint /FORME990011/CHECK_LINK is an endpoint that augments the target.

At line 9030, based on the response from the intermediary, the function 9010 determines if the link should be blocked. If the response text is 'BLOCK', the href attribute of the link is changed to point to a block page provided by the proxy, effectively disabling the original link and redirecting the user to a warning page if clicked, for example. The block page is available at /FORME990012/BLOCK-PAGE, which also augments the target as described above because the client treats this endpoint as if it were available at the origin of the web page due to it being a relative path.

The injected content 9000 also includes a function 9050 (e.g., process_links( )), which finds and processes all hyperlink elements (e.g., anchor <a> elements) on the webpage. The function 9050 selects all <a> elements using document.querySelectorAll('a') and iterates over them with the forEach function. The forEach function is available on iteratable structures (such as arrays) that allows iteration over each element of an iteratable structure. As such, each link element is then passed to the function 9010 (e.g., the function fetch_Link_Data( )) for checking, as described above.

A line 9060 of the injected content 9000 sets up an interval to periodically execute the function 9050. As such, the function 9050 is called every 5 seconds (5000 milliseconds), as set by setInterval( ). That is, the injected content 9000 repeatedly checks all the links on the page at the specified interval, updating their behavior based on the proxy's response.

While the injected content 9000 includes scripts for monitoring and modifying HTML anchor tags, the disclosure is not so limited, as already mentioned. For example, other HTML tags that use a URL to fetch data can also modified based on augmented endpoints, such as an HTML <img> tag with a src attribute pointing to a new image source or a <link> tag for stylesheet resources that might reference an alternative CSS file. Additionally, existing URLs within a document may be modified. For example, switching out a reference to a commonly used JavaScript library with an alternate version hosted by the proxy or changing the source of an image used in the site's logo. Links to other pages, represented by <a> elements, can be altered or newly introduced to redirect users away from potentially harmful content and towards informative pages instead. Essentially, any element or action that initiates an HTTP request by the browser, such as form submissions or API calls made through JavaScript, can be intercepted and redirected to a different URL, which the proxy then handles. To illustrate, and without limitations, an injected script may monitor (e.g., listen for) certain events (such as submit or click events on HTML elements) to direct the proxy to perform custom processing with respect to the events.

As such, augmenting web servers with endpoints (e.g., additional endpoints) enables a broad range of modifications and enhancements to web content, ensuring both the functionality and security of the user's browsing experience without direct alteration or hosting of the original resources on the server.

Figure 10:
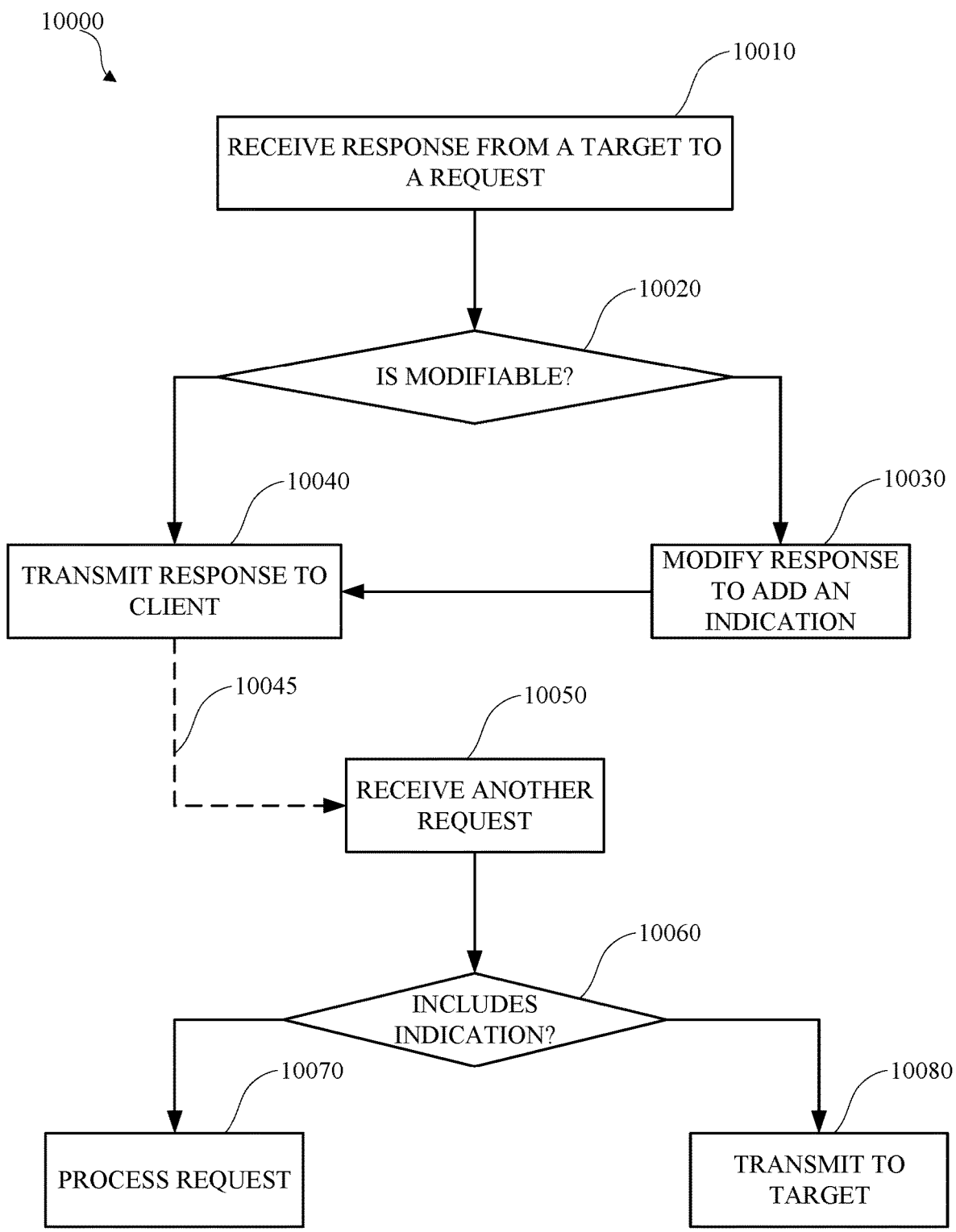
FIG. 10 is a flowchart of a technique for determining whether a request is to be processed by a proxy.

FIG. 10 is a flowchart of a technique 10000 for determining whether a request is to be processed by a proxy. The technique 10000 can be implemented, for example, as a software program that may be executed by computing devices such as the computing device 1000 of FIG. 1. The software program can include machine-readable instructions that may be stored in a memory such as the memory 1300, and that, when executed by a processor, such as the processor 1200, may cause the computing device to perform the technique 10000. The technique 10000 may be implemented at least in part by an intermediary, such as the proxy 3030 shown in FIG. 3. The technique 10000 can be implemented using specialized hardware or firmware. Multiple processors, memories, or both, may be used.

At 10010, the proxy receives a response from a target. The response may be to a request that the proxy transmitted to the target on behalf of a client, as described above. At 10020, the proxy determines whether the response is modifiable. If the response is modifiable, the proxy modifies the response, at 10030. As described above, modifying the response includes adding at least one indication (e.g., a proxy-handing indication and/or a proxy-modifying indication) to the response. The indication may be or may be included in an augmented endpoint. After modification, or if the response is not modifiable, the response is transmitted to the client, at 10040.

The examples of the indications to the proxy illustrated above are addin456, FORME990011, and FORME990012. The indications that the proxy inserts can be in endpoints. The proxy may insert unique indications. The proxy might prepend a prefix (e.g., "addin" or "FORME") to each indication or each different type of endpoint, followed by a unique identifier, possibly a sequential or randomly generated number, thereby enabling the proxy to track and associate specific instructions or actions with each request. In an example, the proxy may insert randomly generated endpoint names. The proxy can maintain a list of endpoints (e.g., a list of the randomly generated endpoints) and the clients to which they were transmitted. As such, upon receiving a request containing such a unique endpoint, the proxy verifies if it corresponds to an endpoint previously communicated to the requesting client. If there is no match, suggesting the request may not be legitimate or intended for current processing, the proxy withholds processing of the request, ensuring that only valid, recognized requests are acted upon and may return an error indication to the user of the client directing the user to, for example, refresh the web page.

Random endpoints may also be utilized to maintain secrecy. In some implementations, endpoints can be configured with expiration durations. Once an endpoint expires, any requests to it will result in an error, prompting the client to refresh the page and receive updated valid endpoints. In some implementations, the proxy may configure augmented endpoints to be one-time use endpoints. The proxy can process one-time endpoints by flagging them for single usage. Once an endpoint has been accessed, it is invalidated, ensuring that each is used no more than its intended one time. If a one-time endpoint is called by the client more than once, the proxy can return an error condition to the client. In some implementations, the injected endpoints can be unique to the session between the target and the client. The session between the target and the client can in fact be the session between the target and the intermediary. A session between the intermediary and the client can have the same duration as the session between the intermediary and the target. The target may expire the session with the client (equivalently, the intermediary), due to, for example, inactivity. When the target expires the session between the intermediary and the target, then the session between the intermediary and the client can also be considered expired.

Time-bound, single-use, or session-use endpoints are usable in preventing unauthorized access and ensuring that access to resources via the proxy remains controlled and transient, thereby enhancing the security model.

At 10050, the proxy receives another request from the client. To be clear, the steps 10010 to 10040 are part of one transaction (e.g., a request-response cycle initiated from the client). At 10050, the proxy receives a new request from the client, which is indicated by a broken line 10045. At 10060, the proxy determines whether the request includes the indication (e.g., the proxy-handing indication) that directs the proxy to process the request itself instead of forwarding the request to the target. If such an indication is present, the proxy proceeds to process the request, at 10070. This internal processing can involve a range of actions, such as retrieving cached content, applying additional security checks, or invoking local services provided by the proxy. If the request does not contain an indication for the proxy to handle it, then, at 10080, the proxy transmits the request to the intended target for processing.

In some implementations, the proxy can, additionally or alternatively, be configured with well-known (e.g., published and defined) endpoints. For illustrative purposes, such an endpoint (e.g., resource) may be '/proxy-info.json'. For example, prior to responding to a request from a client, a target may query the client for whether it includes such an endpoint and retrieves its content. The proxy provides the resource on behalf of the client. As such, targets (e.g., websites) may query such well-known endpoints for relevant information, enabling them to adjust their content or user experience accordingly. The resource can include configurations as to the extent of functions enabled by the proxy, such as, for example, threat protection functions, ad blocking functions, or any other functions. For example, via such a resource, the proxy can essentially inform targets of a client's setup, such as any active threat protection offered or implemented based on the content of the resource.

In certain scenarios, hosting additional endpoints directly on the original server's domain may not be desirable. To circumvent this, a specialized domain name, such as securewebproxy.com, may be registered. This domain is unique in that it does not correlate with an active web server or host any tangible content. Instead, its sole purpose is to act as a symbolic representation of the proxy service. This domain may be configured to point to a non-routable or arbitrary network address, including localhost (e.g., 127.0.0.1), ensuring that direct access attempts do not reach a real server but are instead intercepted by the proxy. Upon intercepting a request destined for this domain, the proxy employs the request's Host header or the TLS Server Name Indication (SNI) field as mechanisms to recognize that the traffic is intended for the proxy, thereby triggering the proxy to process and respond to the request internally. As such, the proxy can assert control over its designated traffic without the necessity of a physical server presence.

In such a setup, since the securewebproxy.com serves content as a server, CORS policies are configured to allow access, as necessary. This ensures that web applications can interact with the proxied content without running into browser security restrictions, such as described above.

The proxy can be configured to analyze various fields within headers of an HTTP request to determine whether the request is intended for processing by the proxy or should be passed through to the actual backend (e.g., target) server. Fields such as, but not limited to, the request method (e.g., GET, POST), the requested path, cookies, custom headers, the host name, and subdomains can be used by the proxy to make the determination.

Figure 11:
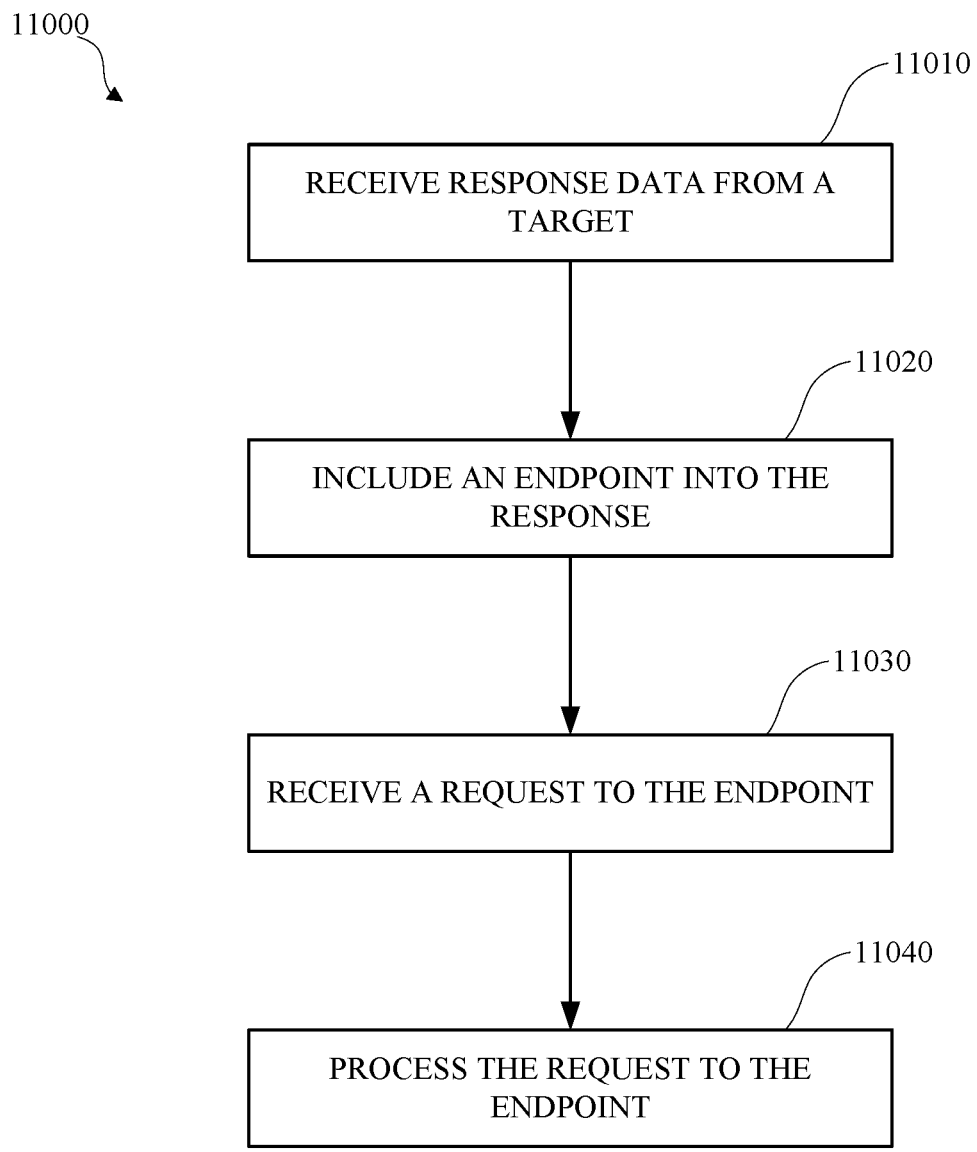
FIG. 11 is a flowchart of a technique for determining whether a request is to be processed by a proxy.

To further describe some implementations in greater detail, reference is next made to examples of techniques which may be performed by or using target (e.g., web server) augmentation with endpoints. FIG. 11 is a flowchart of a technique 11000 for determining whether a request is to be processed by a proxy. The technique 11000 can be executed using computing devices, such as the systems, hardware, and software described with respect to FIGS. 1-10. The technique 11000 can be implemented, for example, as a software program that may be executed by computing devices such as the computing device 1000 of FIG. 1. The software program can include machine-readable instructions that may be stored in a memory such as the memory 1300, and that, when executed by a processor, such as the processor 1200, may cause the computing device to perform the technique 11000. The technique 11000 may be implemented at least in part by an intermediary, such as the proxy 3030 shown in FIG. 3. The technique 11000 can be implemented using specialized hardware or firmware. Multiple processors, memories, or both, may be used.

At 11010, response data are received from a target based on a request from a client to the target, such as a request transmitted from the client to the target. The response data is received by the intermediary based on a first request transmitted from the client to the target. In an example, the intermediary can be implemented at a computing device that implements the client. In an example, the intermediary and the client can be implemented at different computing devices.

At 11020, the intermediary includes (e.g., injects) an endpoint into the response data prior to transmitting the response data (i.e., the modified response data) to the client. For example, the intermediary may include a script in the response data and the script can include the endpoint. The script can be configured to listen for an event triggered within the client such that, in response to the event being triggered at the client, the intermediary receives a second request directed to the target at the endpoint. In an example, the endpoint interpretable by the client as being available at the target includes a relative URL. In an example, the endpoint can be a one-time use randomly generated endpoint.

At 11030, the intermediary receives the second request from the client directed to the target at the endpoint. At 11040, the intermediary itself processes (e.g., handles) the second request without forwarding the request to the target. In an example, prior to processing the second request directed to the target, the intermediary determines that it is to process the second request by validating the endpoint against a list of endpoints previously generated by the intermediary in association with the client.

Unless expressly stated, or otherwise clear from context, the terminology "computer," and variations or wordforms thereof, such as "computing device," "computing machine," "computing and communications device," and "computing unit," indicates a "computing device," such as the computing device 1000 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving, by an intermediary between a client and a target, response data from the target based on a first request from the client to the target;
   including in the response data, by the intermediary, an endpoint interpretable by the client as being available at the target, wherein the endpoint does not exist at the target and is a relative Uniform Resource Locator (URL) with respect to a domain of the target;
   transmitting, by the intermediary, the response data including the endpoint to the client;
   receiving, by the intermediary, a second request from the client directed to the target at the endpoint; and
   processing, by the intermediary and without forwarding to the target, the second request directed to the target.

2. The method of claim 1, wherein the intermediary is implemented at a computing device that implements the client.

3. The method of claim 1, wherein the intermediary and the client are implemented at different computing devices.

4. The method of claim 1, wherein including in the response data, by the intermediary, the endpoint interpretable by the client as being available at the target comprises:
   including, by the intermediary, a script executable by the client in the response data, wherein the script includes the endpoint.

5. The method of claim 4, wherein the script includes a listener for an event triggered within the client, and wherein in response to the event being triggered at the client, the intermediary receives the second request directed to the target at the endpoint.

6. The method of claim 1, wherein the endpoint is a one-time use endpoint.

7. The method of claim 1, comprising:
prior to processing the second request directed to the target, determining, by the intermediary, that the intermediary is to process the second request by validating the endpoint against a list of endpoints previously generated by the intermediary in association with the client.

8. A device, comprising:
one or more memories; and
one or more processors, the one or more processors configured to execute instructions stored in the one or more memories to:
  receive response data from a target device based on a first request from a client device to the target device, wherein the device is an intermediary between the client device and the target device;
  include in the response data an endpoint interpretable by the client device as being available at the target device, wherein the endpoint does not exist at the target device and is a relative Uniform Resource Locator (URL) with respect to a domain of the target device;
  transmit the response data including the endpoint to the client device;
  receive a second request from the client device directed to the target device at the endpoint; and
  process, without forwarding to the target device, the second request directed to the target device.

9. The device of claim 8, wherein the device is the client device.

10. The device of claim 8, wherein the device and the client device are different computing devices.

11. The device of claim 8, wherein the endpoint is included in a script executable by the client device.

12. The device of claim 11, wherein the script is configured to detect an event triggered within the client device and to transmit the second request directed to the target device at the endpoint when the event is triggered.

13. The device of claim 8, wherein the endpoint is a one-time use endpoint.

14. The device of claim 8, wherein the one or more processors are configured to execute instructions stored in the one or more memories to:
  prior to processing the second request directed to the target device, determine to process the second request by validating the endpoint against a list of endpoints previously generated in association with the client device.

15. One or more non-transitory computer readable media storing instructions operable to cause one or more processors to perform operations comprising:
  receiving, by an intermediary between a client and a target, response data from the target based on a first request from the client to the target;
  including in the response data, by the intermediary, an endpoint interpretable by the client as being available at the target, wherein the endpoint does not exist at the target and is a relative Uniform Resource Locator (URL) with respect to a domain of the target;
  transmitting, by the intermediary, the response data including the endpoint to the client;
  receiving, by the intermediary, a second request from the client directed to the target at the endpoint; and
  processing, by the intermediary and without forwarding to the target, the second request directed to the target.

16. The one or more non-transitory computer readable media of claim 15, wherein including in the response data, by the intermediary, the endpoint interpretable by the client as being available at the target comprises:
  including a script executable by the client in the response data, wherein the script includes the endpoint.

17. The one or more non-transitory computer readable media of claim 16, wherein the script includes a listener for an event triggered within the client, wherein in response to the event being triggered at the client, the intermediary receives the second request.

18. The one or more non-transitory computer readable media of claim 15, wherein the operations comprise:
  prior to processing the second request directed to the target, determining that the intermediary is to process the second request by validating the endpoint against a list of endpoints previously generated by the intermediary in association with the client.

19. The one or more non-transitory computer readable media of claim 15, wherein the intermediary is implemented at a computing device that implements the client.

20. The one or more non-transitory computer readable media of claim 15, wherein the endpoint is a one-time use endpoint.

* * * * *